United States Patent [19]

Teramachi

[11] Patent Number: 4,603,922

[45] Date of Patent: Aug. 5, 1986

[54] ROLLER BEARING FOR LINEAR SLIDING MOVEMENT

[76] Inventor: Hiroshi Teramachi, 34-8, Higashitamagawa 2-chome, Setagaya-ku, Tokyo, Japan

[21] Appl. No.: 789,865

[22] Filed: Oct. 21, 1985

[30] Foreign Application Priority Data

Oct. 27, 1984 [JP] Japan .................................. 59-226595

[51] Int. Cl.$^4$ ............................................. F16C 29/06
[52] U.S. Cl. .................................................... 384/44
[58] Field of Search .............. 308/3 R, 3 A, 6 R, 6 A; 464/168

[56] References Cited

U.S. PATENT DOCUMENTS

| | | | |
|---|---|---|---|
| 4,253,709 | 3/1981 | Teramachi | 308/6 C |
| 4,296,974 | 10/1981 | Teramachi | 308/6 C |
| 4,348,064 | 9/1982 | Teramachi | 308/6 C |
| 4,427,240 | 1/1984 | Teramachi | 308/6 C |
| 4,496,196 | 1/1985 | Teramachi | 308/6 C |
| 4,527,841 | 7/1985 | Teramachi | 308/6 C |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

This invention provides a roller bearing for linear sliding movement comprising a sliding block formed with a loading groove and a non-loading groove at the top end of the horizontal portion and at the lower end of the suspending portion, a pair of roller guides mounted at the top end of the horizontal portion and at the lower end of the suspending portion of the sliding block, a raceway block having upper and side rolling faces opposing to the respective loading grooves and a plurality of rollers circulating through each of the infinite roller tracks for receiving the load, in which the raceway block is perforated with attaching holes in perpendicular to the upper surface of the horizontal portion, a load acting line downwardly extended in perpendicular and slanted upwardly are applied relative to the mounting holes and a horizontal urging force is exerted to the side of the sliding block to apply a preloading.

2 Claims, 10 Drawing Figures

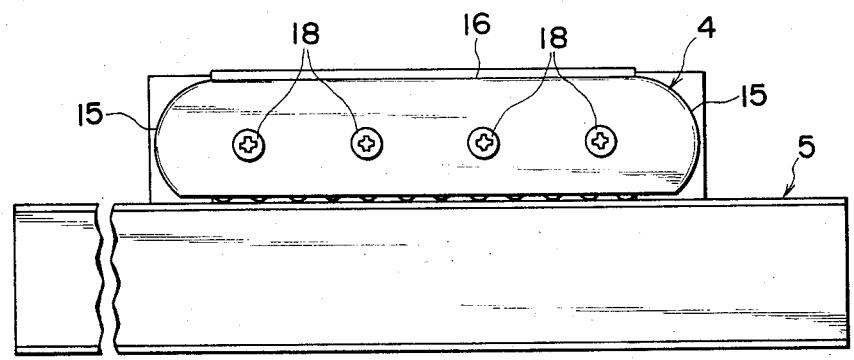
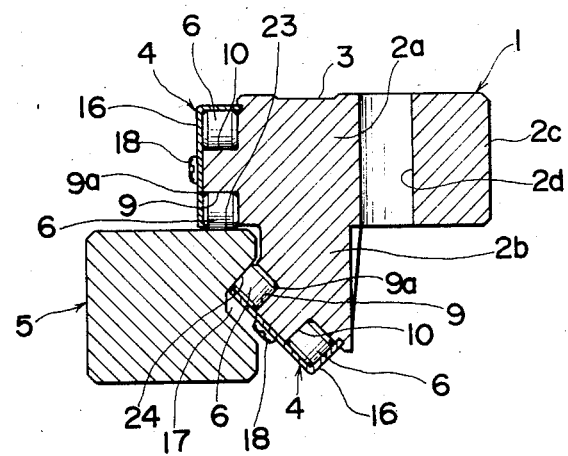

ROLLER BEARING FOR LINEAR SLIDING MOVEMENT

FIELD OF THE INVENTION AND RELATED ART STATEMENT

This invention concerns a roller bearing for linear sliding movement that linearly guides a sliding movable body in a slide portion, for example, in machine tools such as NC machines or industrial robots.

The linear guiding bearings of this type have been used broadly in slide portions of various general industrial machines such as for X.Y.Z axes of machine tools, for example, in machining centers and NC machines, automatic tool exchanging devices, automatic welders, injection molding machines, industrial robots or the likes.

However, most of the bearings of this kind have employed balls as the means put between a sliding block and a raceway block for the rolling guide of the former block. Further, the sliding block or the raceway block is formed into a cross sectional configuration in symmetrical with left and right, and the both sleeves of the sliding block are configurated so as to embrace therebetween the both shoulders of the raceway block.

Therefore, the sliding block and the raceway block are in contact with each other by means of the balls and, in order to endure a heavy load, it has been necessary to increase the length of the loading region of the infinite ball track to increase the number of balls present in the loading area. However, this results in a problem that the size of the sliding block is excessively enlarged. Further, since the load in the vertical and lateral directions have been received by a pair of rolling grooves formed on each of the shoulders of the raceway block, causing a train of loading balls on the side of the sliding block to roll in each of the rolling grooves and putting each shoulder of the raceway block between the pair of the loading ball trains, four grooves have to be fabricated per one raceway block and four infinite ball tracks have to be formed to the sliding block. This requires a number of working steps for the fabrication of the raceway block and the sliding block, particularly, for the grinding finishment of the grooves, as well as complicates the assembling work and the preloading control and increases the cost also due to the increased number of parts. Further, since the blocks are put under the point-to-point contact, it has a drawback of insufficient strength against heavy loads.

OBJECT AND SUMMARY OF THE INVENTION

Accordingly, it is an object of this invention to provide a roller bearing for linear sliding movement adapted to receive loads exerting in vertical and lateral directions on a sliding block by means of rollers so as to provide excellent strength even against a heavy load and capable of avoiding the excessive increase in the size of the sliding block.

Another object of this invention is to provide a roller bearing for linear sliding movement capable of moderating the troublesome fabrication of grooves to raceway block and of infinite tracks to the sliding block, decreasing the number of steps for the grinding finishment of the grooves and the number of parts in the sliding or raceway block and facilitating the mounting to a fixing portion.

A further object of this invention is to provide a roller bearing for a linear sliding movement capable of carrying out the preloading control for the sliding block with a simple operation depending on the application use, minimizing the load exerted to the point of contact action resulted from a horizontal load and thereby improving the stability in the sliding movement and reducing the size of the apparatus.

A still further object of this invention is to provide a roller bearing for linear sliding movement capable of controlling the preloading without detaching machines disposed on a movable body even during the use of the apparatus by mounting the movable body from below the mounting portion protruded on the side opposite to the horizontal portion of the sliding block by means of mounting bolts.

Specifically, in accordance with this invention, a raceway block having upper and side rolling faces, that oppose to the loading grooves formed at the top end of a horizontal portion and at the lower end of a suspending portion suspended from the horizontal portion of a sliding block respectively, are formed with mounting holes for passing fixing bolts therethrough, a load acting line extending between the upper rolling face and the loading groove formed at the top end of the horizontal portion of the sliding block opposing to the upper rolling face is directed from above to below, another load acting line extended between the side rolling face and the loading groove formed at the lower end of the suspending portion of the sliding block opposing to the side rolling face is directed from below to above while being slanted toward the vertical line in perpendicular to the upper surface of the horizontal portion on one side of the mounting hole and, upon fixing the sliding block to a movable member, preloading is controlled by exerting an urging force directed from the side of the movable body to the horizontal portion of the sliding block.

This invention provides a preferred embodiment, in which the mounting hole for the raceway block is perforated substantially in perpendicular to the upper surface of the horizontal portion of the sliding block, the upper rolling face and the side rolling face are formed on one side of the mounting hole, the load acting line between the upper rolling face and the loading groove formed at the top end of the horizontal portion of the sliding block opposing to the upper rolling face is directed in perpendicular to the upper surface of the horizontal portion, another load acting line between the side rolling face and the loading groove formed at the lower end of the suspending portion of the sliding block opposing to the side rolling face is upwardly slanted relative to the vertical line in perpendicular to the upper surface of the horizontal portion, so that the preloading control by acting the urging force from the side of the movable body to the horizontal portion of the sliding block can be carried out more effectively. In the roller bearing for linear sliding movement according to this invention, since the loading area can be increased by the use of rollers instead of balls, a heavy load can be endured particularly in the vertical direction and, in addition, since the rollers are put between two loading grooves at the top end of the horizontal portion and at the lower end of the suspending portion of the sliding block and the upper and the side rolling faces of the raceway block, the number of the loading grooves and the rolling faces can be decreased and the assembling work can be reduced. Further, upon fixing the sliding block to the movable body, since the fixing block and the movable body can be assembled from below the mounting portion of the sliding block by means of mounting bolts, if preloading control is required during use, it can be carried out by slackening the mounting bolts to adjust the adjusting bolts without detaching various machines mounted to the upper portion of the movable body. Further, since the urging force is exerted from the movable body to the sliding block in the direction from the mounting portion to the horizontal portion, the preloading can be adjusted simply depending on the purpose of use. Furthermore, the acting point of contact between the raceway block and the sliding block can be lowered and the load exerting on the acting point of contact can be minimized also relative to the horizontal load thereby improve the stability.

BRIEF DESCRIPTION OF THE DRAWINGS

FIG. 6 is a rear elevational view of FIG. 2;

FIG. 7 is a cross sectional view taken along line VII—VII in FIG. 2;

DETAILED DESCRIPTION OF PREFERRED EMBODIMENTS

Figure 1:
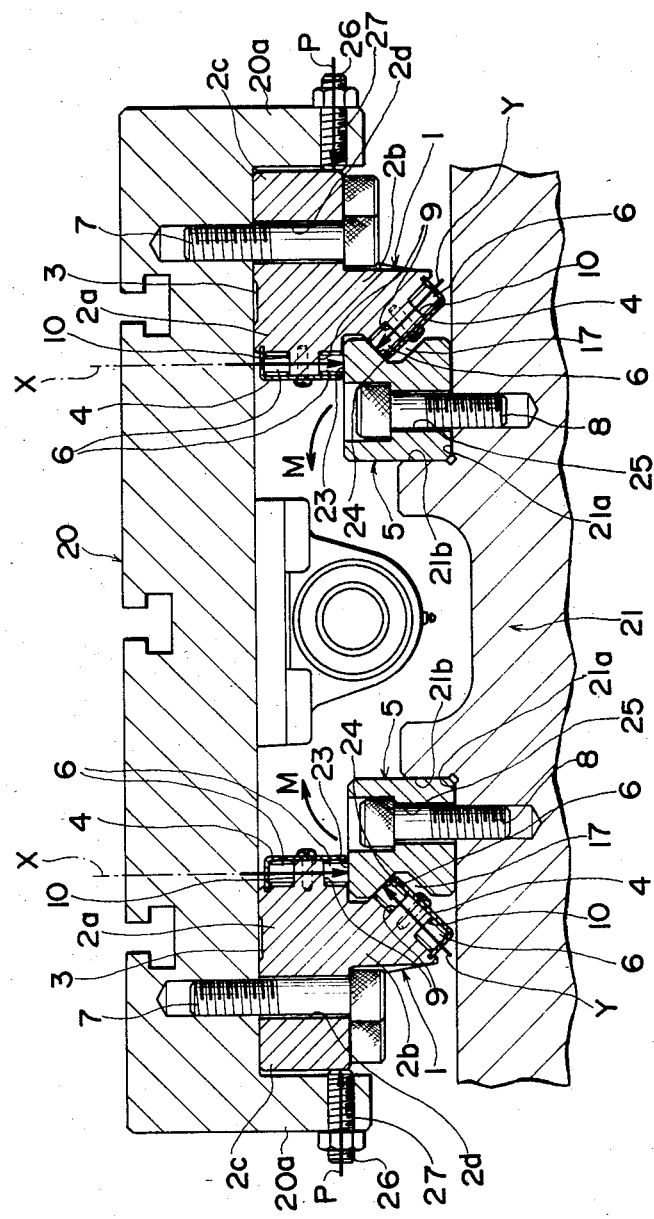
FIG. 1 is a cross sectional view showing the state of use for one embodiment of the roller bearing for linear sliding movement according to this invention.

This invention will now be described in detail by way of its preferred embodiments referring to the accompanying drawings.

As shown in FIG. 1 through FIG. 6, the roller bearing according to this invention comprises a sliding block 1 substantially of an L-shaped cross section having a horizontal portion 2a and a suspending portion 2b suspended from one end thereof and mounted to a movable body 20 such as a table by means of mounting bolts 7 at the upper surface 3 of the horizontal portion thereof, a pair of roller guides 4 secured at the top end of the horizontal portion 2a and at the lower end of the suspending portion 2b of the sliding block 1, a raceway block 5 fixed to a fixing portion 21 such as a bed so as to be situated on the side of the lower surface of the horizontal portion 2a by means of fixing bolts 8 as fixing means and a plurality of rollers 6 for receiving the load between the sliding block 1 and the raceway block 5 while circulating the infinite roller tracks formed respectively to the horizontal portion 2a and the suspending portion 2b.

The sliding block 1 is formed with loading grooves 9 constituting the loading area for the infinite roller tracks along the respective axial directions and having flat running face on the lower surface at the top end of the horizontal portion 2a and on the inner surface at the lower end of the suspending portion 2b and groove-like non-loading portions 10 corresponding to the loading grooves 9 along the respective axial directions and constituting the non-loading area for the infinite roller track on the upper surface at the top end of the horizontal portion 2a and on the outer surface at the lower end of the suspended portion 2b of the horizontal portion 2. In this case, a mounting portion 2c is protruded from the base of the sliding block 1 to the side opposite to the horizontal portion 2a and mounting holes 2d for loosely engaging mounting bolts 7 therethrough are perforated in the mounting portion 2c axially in two rows. The sliding block 1 having thus been constituted is fixed to the movable body 20 by means of the mounting bolts 7 passing the mounting holes 2d from below and screw coupling the movable body 20, in which preloading can be controlled by temporarily clamping the mounting bolts 7 and then urging adjusting bolts 26, which is clamped from the side of the movable body 20 to the upper portion of the sliding block, from the mounting portion 2c to the horizontal portion 2a.

Figure 2:
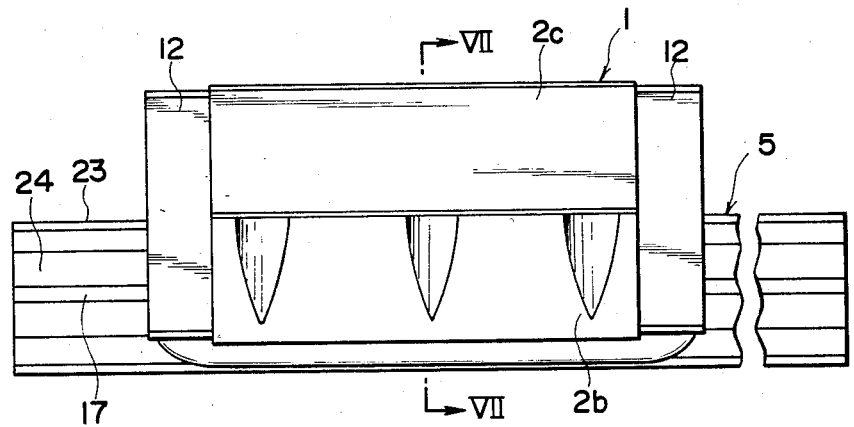
FIG. 2 is a front elevational view of the roller bearing for linear sliding movement.
Figure 3:
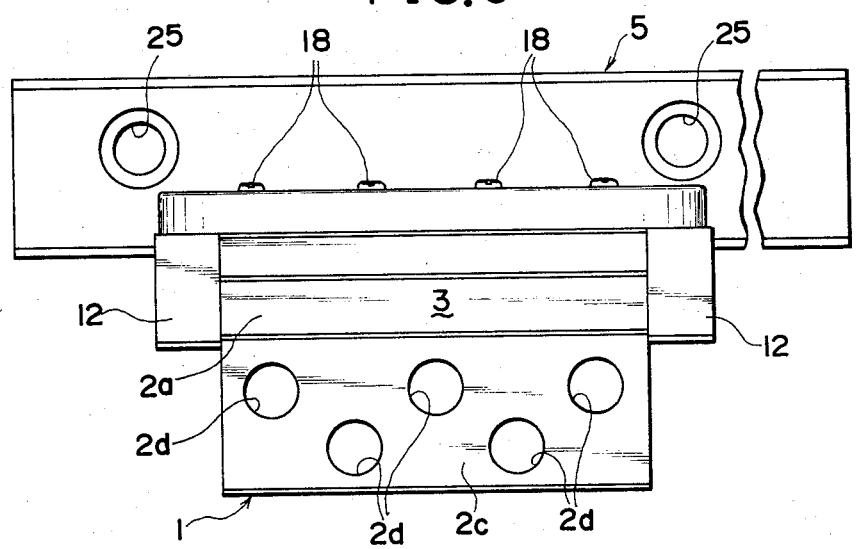
FIG. 3 is a plan view of FIG. 2.
Figure 5:
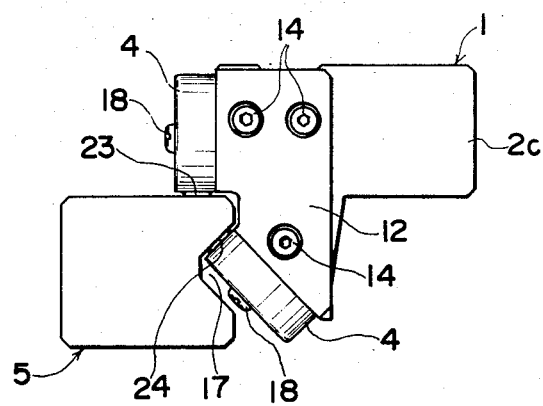
FIG. 5 is a side elevational view of FIG. 2.

As shown in FIGS. 2, 3 and 5, a cover 12 made of synthetic resin is secured to each of the longitudinal ends of the sliding block 1 by means of a fixing bolt 14 passing through the aperture (not illustrated) perforated in the cover 12.

Figure 4:
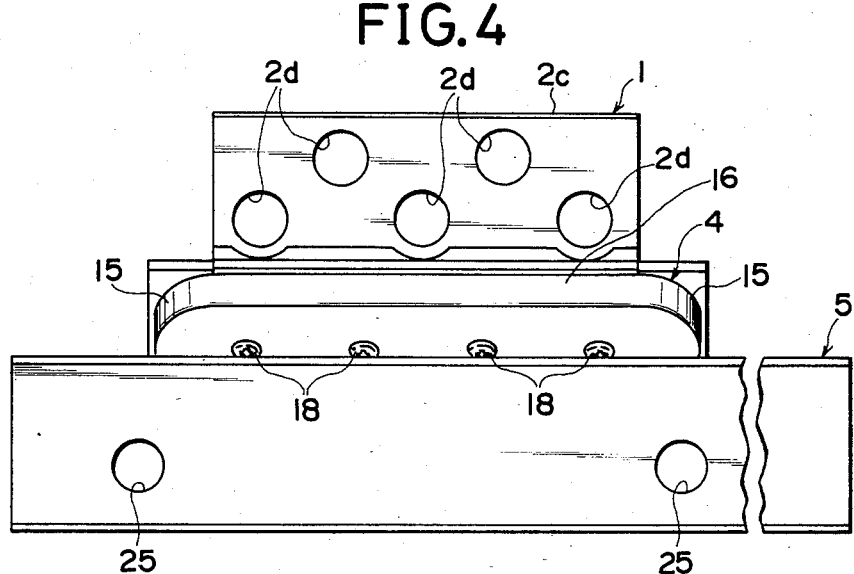
FIG. 4 is a bottom view of FIG. 2.

Further, as shown in FIGS. 4, 6 and 7, the roller guide 4 is formed through pressing of a metal plate or injection molding of a rigid synthetic resin and comprises a generally semi-circular roller direction conversion guide 15 at each of the ends thereof and a retaining portion 16 of a generally L-shaped configuration between the roller direction conversion guides 15. The retaining portions 16 constitute the loading area and the non-loading area in the infinite roller tracks in combination with the loading groove 9 and the groove-like non-loading portion 10 formed respectively at the top end of the horizontal portion 2a and at the lower end of the suspending portion 2b of the sliding block 1, and each of the roller direction conversion guides 15 guides each of the rollers, that is, cylindrical rolls between the loading area and the non-loading area of the infinite roller track. The roller guide 4 is attached to the sliding block 1 by means of small screws 18 passing through an aperture (not illustrated) preforated to the retaining portion 16 and screw coupled to each of the mounting holes (not illustrated). In this case, the roller direction conversion guide portion 15 of the roller guide 4 is engaged to secure to a generally semi-circular ataching groove disposed to the cover 12 and the retaining portion 16 is engaged to secure in a linear attaching groove disposed to the sliding block 1.

Figure 8:
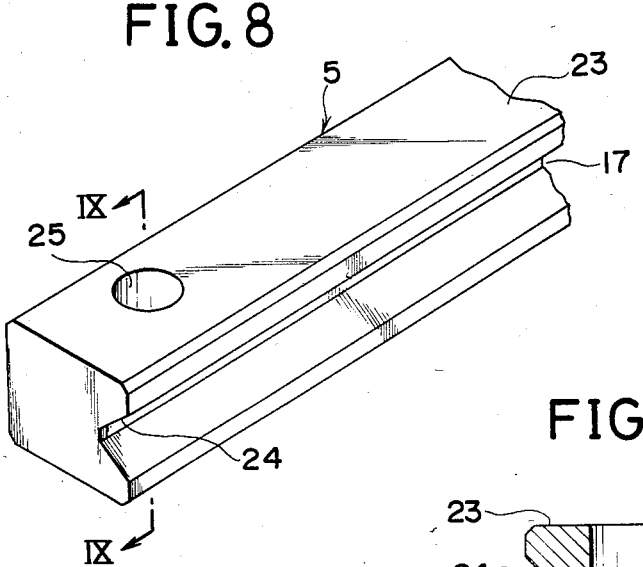
FIG. 8 is a perspective view of the raceway block in this invention.
Figure 9:
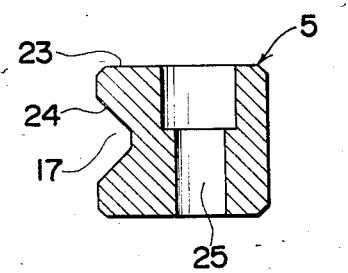
FIG. 9 is a cross sectional view taken along line IX—IX in FIG. 8.

As shown in FIGS. 8 and 9, the raceway block 5 is formed into a generally rectangular cross sectional shape having a V-shaped notch 17 at the side of the shoulder on one side thereof and is formed, at the flat surface above the notch 17, with a planer upper rolling face 23 opposing to the running face of the loading groove 9 formed to the lower surface at the top end of the horizontal portion 2a of the sliding block 1 and, at the downwardly slanted surface of the notch 17, with a side rolling face 24 opposing to the running face of the loading groove 9 formed to the inner surface at the lower end of the suspending portion 2b of the sliding block 1. The raceway block 5 is perforated, at the central portion thereof, with a mounting hole 25 for fixing means substantially in perpendicular to the upper surface 3 of the horizontal portion of the sliding block 1, so that it is secured to the fixing portion 21 by engaging, that is, screw coupling the fixing bolt 8 passing through the mounting hole 29 to the fixing portion 21. Upon fixing the raceway block 5 to the fixing portion 21, the bottom face and the lower portion of the side face erected perpendicularly from one end of the bottom face of the raceway block 5 are abutted to engage against the flat face 21a and an engaging surface 21b erected in perpendicular from the flat face 21a constituting the reference planes for mounting the fixing portion 21 respectively, and then secured to the fixing portion 21 by means of the fixing bolt 8. Thus, the upper rolling face 23 of the raceway block 5 is made in parallel with the upper surface 3 of the horizontal portion of the sliding block 1, the load acting line X for the roller at the top end of the horizontal portion 2a of the sliding block 1 can be in contact approximately perpendicularly to the upper surface 3 of the horizontal portion and, further, the load acting line Y for the roller 6 at the lower end of the suspending portion 2b of the sliding block 1 can be made in contact with the side rolling face 24 in an upwardly slanted manner. Furthermore, the adjusting bolt 26 clamped from the side of the movable body 20 for the preloading control of the sliding block 1 is screw coupled passing through a horizontal threaded hole 27 perforated in the suspended portion 20a on the side of the movable body 20 and the top end of the adjusting bolt 26 is abutted against the lower portion on the side of the mounting portion 2c of the sliding block 1. Accordingly, preloading is applied and can be controlled easily by the urging action of the adjusting bolt 26 along the urging action line P acting from the side of the movable body to the middle portion of the sliding block 1. While a rotating force M is generated as shown in FIG. 1 to the raceway block 5 by the urging force of the adjusting bolt 26 upon preloading control, since the lower portion on the side of the raceway block 5 is abutted against the engaging face 21b of the fixing portion 21, a reaction is resulted around the upper corner of the engaging face 21b as a fulcrum against the rotating force M, which improves the stabilization upon mounting the raceway block 5, in combination with the vertical clamping force of the fixing bolt 8.

The roller bearing for linear sliding movement according to this invention having thus been constituted is used by fixing the raceway block 5 to the flat surface 21a and the engaging surface 21b as the reference planes for mounting which are formed to the fixing portion 21 such as a bed mounted to a machine or the like by means of the fixing bolt 8 as shown in FIG. 1, while placing and mounting the movable body 20 on the mounting face 3 of the sliding blocks 1 constituting the bearing sliding along the raceway block 5 by means of the mounting bolt 7 and then assembled into a linear sliding table for guiding the linear reciprocal movement of various machineries. Upon assembling work, the raceway block 5 is at first abutted to engage against the flat face 21a and the engaging face 21b of the fixing portion 21 such as a bed. Then, the raceway block 5 is mounted by screw coupling the fixing bolt 8 to the fixing portion 21 passing through the mounting hole 25 perforated in the raceway block 5. Then, the movable body 20 is descended from above in a state where the rollers 6 on the side of the sliding block 5 are engaged to the upper and the side rolling faces 23, 24 of the raceway block 5 placed on the sliding block 1 and then the movable body 20 is mounted by the mounting bolt 7 passing through the mounting hole 2d from below. In this case, while one of the left and right bolts 7 in FIG. 1 is clamped tightly, the other mounting bolt 7 is left in a temporarily clamped state and the urging action line P of the adjusting bolt 26 clamped from the side of the movable body 20 is urged so as to be situated on the side at the middle portion of the raceway block 5, by which the preloading can be applied and, in addition, the degree of the pressure can be adjusted to control the amount of the preloading depending on the use.

Figure 10:
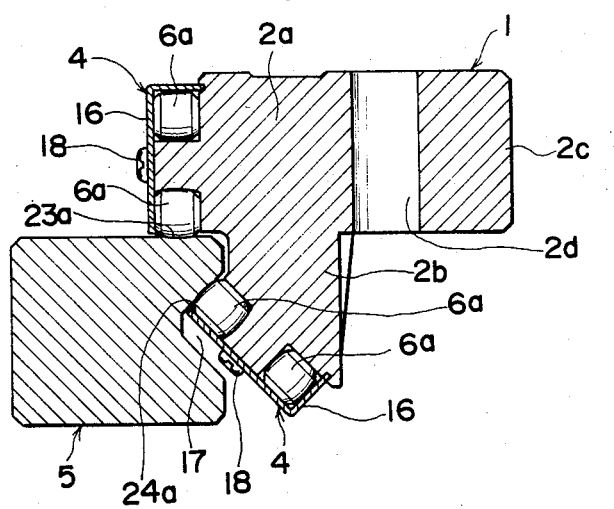
FIG. 10 is a cross sectional view showing the second embodiment of the roller bearing for linear sliding movement according to this invention.

While the explanations have been made for the embodiment having cylindrical rolls, spherical rolls 6a can be used instead of the cylindrical rolls as shown in FIG. 10 and, in this case, the upper and the side rolling faces 23a and 24a of the raceway block 5 are formed with an arcuate face with a radius of curvature somewhat larger than that of the spherical rolls 6a. Since automatic adjustment is possibly even in a case where the raceway block 5 contains slight bent portions locally, excessive localized loading can be avoided.

What is claimed is:

1. A roller bearing for linear sliding movement comprising a sliding block having a horizontal portion and a suspending portion suspended from the base end thereof and formed with a loading groove and a non-loading groove constituting a loading area and a non-loading area of an infinate roller track way respectively at the top end of the horizontal portion and at the lower end of the suspending portion, a pair of roller guides mounted at the top end of the horizontal portion and at the lower end of the suspending portion of said sliding block respectively and constitute the infinate roller track in combination with said loading groove and non-loading groove formed at the top end of the horizontal portion and at the lower end of the suspending portion, a raceway block having upper and side rolling faces opposing to the respective loading grooves formed at the top end of the horizontal portion and at the lower end of the suspending portion of said sliding block and a plurality of rollers circulating through each of the infinite roller track formed at the top end of the horizontal portion and at the lower end of the suspending portion of said sliding block in combination with said roller guides and receiving the load between each of the loading grooves on the side of the sliding block and each of the rolling faces on the side of the raceway block, in which said raceway block is perforated with mounting holes through which fixing bolts are passed and formed with said upper rolling face and the side rolling face relative to the mounting hole generally is perpendicular to the upper surface of the horizontal portion, a load acting line extended between the upper rolling face and the loading groove formed at the top end of the horizontal portion of the sliding block is directed in perpendicular to the upper surface of said horizontal portion, while another load acting line extended between the side rolling face and the loading groove formed at the lower end of the suspending portion of said sliding block opposing to the side roller face is slanted upwardly relative to the vertical line in perpendicualr to the upper surface of said horizontal portion and, upon fixing the sliding block to a movable body, preloading is applied by exerting an urging force from the side of the movable body to the side of the horizontal portion.

2. The roller bearing for linear sliding movement as defined in claim 1, wherein a mounting portion is protruded to the sliding block from the base end of the horizontal portion of said block on the side opposite to the horizontal portion, mounting holes capable of loosely engaging therethrough mounting bolts for mounting said sliding block to said movable body are perforated axially in two rows in said mounting portion and, upon fixing said sliding block to said movable body, said mounting bolts are mounted to the movable body passing through the mounting holes from below.

* * * * *